United States Patent [19]

Wolf et al.

[11] Patent Number: 4,936,715
[45] Date of Patent: Jun. 26, 1990

[54] APPARATUS FOR PNEUMATICALLY CONVEYING BULK MATERIAL

[75] Inventors: Manfred Wolf, Markdorf; Hans Hoppe, Vogt; Dieter Heep, Bergatreute; Norbert Eberhard, Ertingen, all of Fed. Rep. of Germany

[73] Assignee: Waeschle Maschinenfabrik GmbH, Ravensburg, Fed. Rep. of Germany

[21] Appl. No.: 201,525

[22] Filed: Jun. 2, 1988

[30] Foreign Application Priority Data

Jul. 10, 1987 [DE] Fed. Rep. of Germany ....... 3722911

[51] Int. Cl.$^5$ ............................................. B65G 53/66
[52] U.S. Cl. ........................................ 406/14; 406/95; 138/39; 138/148
[58] Field of Search ....................... 406/95, 93, 94, 85, 406/14, 191, 193, 195, 196; 137/13; 138/39, 103, 148, 155; 285/55, 161, 158, 368

[56] References Cited

U.S. PATENT DOCUMENTS

| | | | |
|---|---|---|---|
| 2,897,005 | 7/1959 | Wiltse | 406/95 |
| 4,171,925 | 10/1979 | Krambrock | 406/95 |
| 4,715,749 | 12/1987 | Hoppe et al. | 406/95 |

FOREIGN PATENT DOCUMENTS 2166701  5/1986  United Kingdom ................. 406/95

Primary Examiner—Sherman D. Basinger
Assistant Examiner—Stephen P. Avila
Attorney, Agent, or Firm—Henry M. Feiereisen

[57] ABSTRACT

An apparatus for pneumatically conveying bulk material in particular bulk material which is difficult to handle includes a conveyor line having a plurality of conveyor line sections for transporting the bulk material. Each of the conveyor line sections comprises a rigid outer pipe and an elastic inner pipe of an outer diameter which is smaller than the inner diameter of the outer pipe in pressureless state. The connection of adjacent conveyor line sections is attained by a sectional ring which is placed over each axial end of the outer pipe and about which the elastic pipe is folded outwardly, a flange element arranged between the thus shaped axial ends of adjoining conveyor line sections, and external brace elements extending between successive flange elements for bracing the latter so as to connect adjoining conveyor line sections in pressure-sealed manner. Each flange element receives a valve element and is provided with a radial bore to allow communication between a clean gas carrying secondary line and the conveyor line.

23 Claims, 4 Drawing Sheets

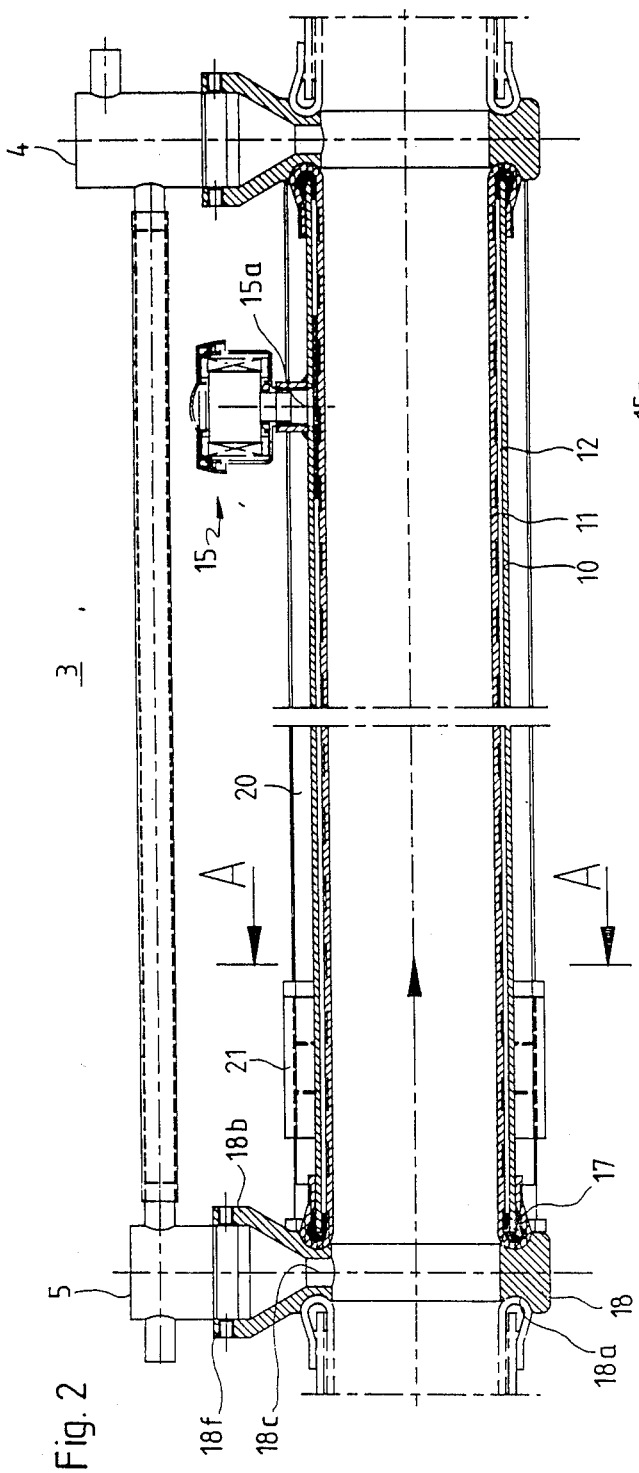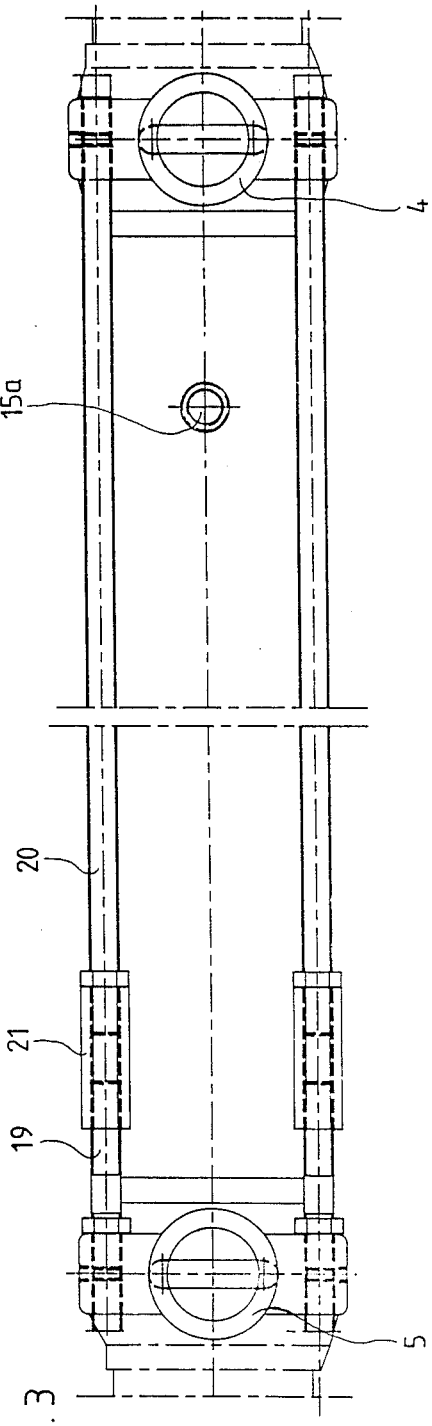
Fig. 2
Fig. 3

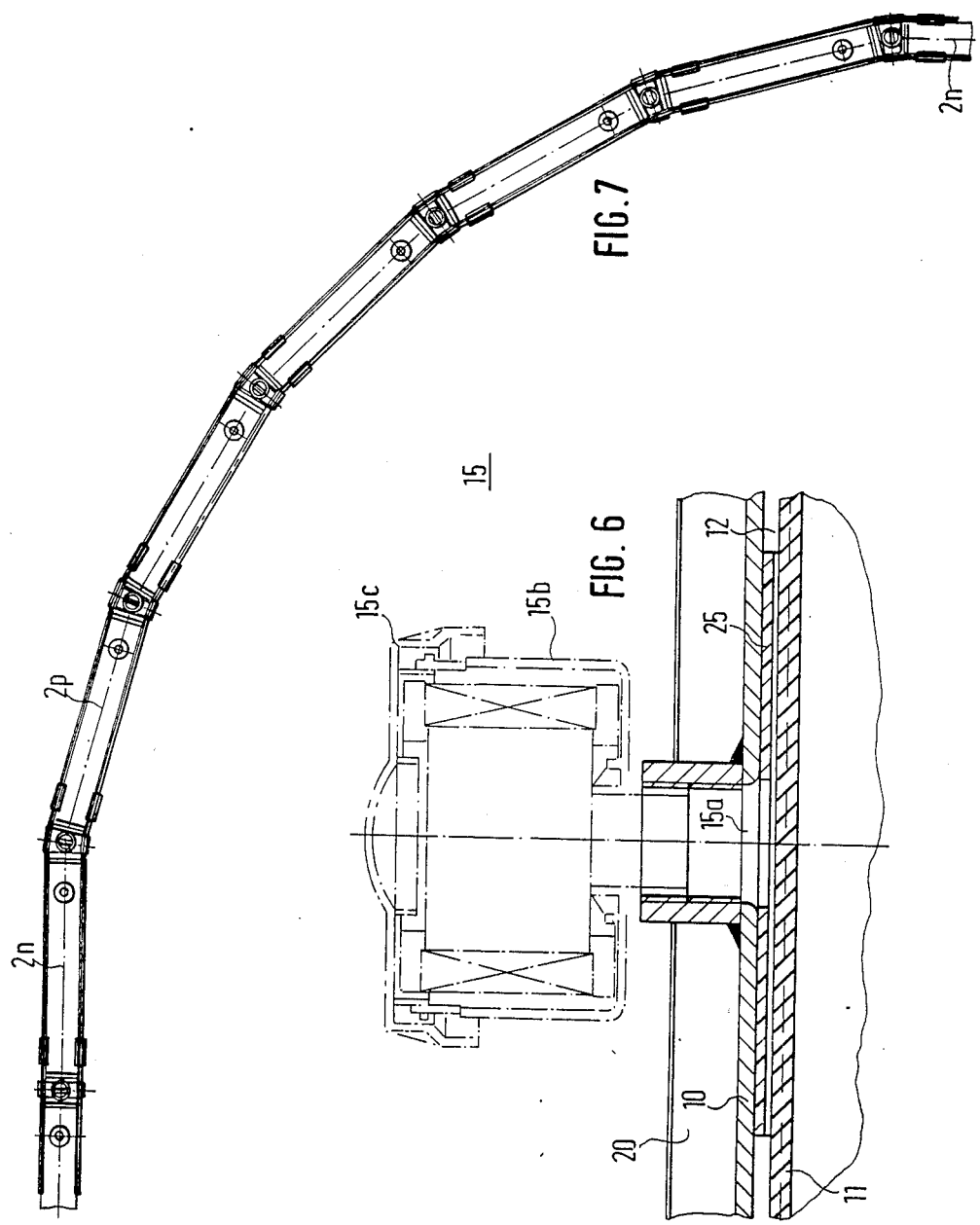

APPARATUS FOR PNEUMATICALLY CONVEYING BULK MATERIAL

BACKGROUND OF THE INVENTION

The present invention relates to an apparatus for pneumatically conveying bulk material.

An apparatus of this kind may include a conveyor line consisting of a plurality of conveyor line sections joined to each other via flanges and each including a rigid outer pipe and an elastic inner pipe which in pressureless state has an outer diameter which is smaller than the inner diameter of the metallic pipe and is outwardly folded at both its ends about the respective end faces of the outer pipe. Cooperating with the conveyor line is a secondary line which contains clean gas and is subdivided in sections by shut off valves responsive to a pressure difference between the secondary line and the conveyor line. Each section is connected with the interior of the conveyor line via overflow valves.

Such an apparatus is known from the German publication DE-OS 34 37 560 and operates in a manner as known from the German Pat. No. DE-PS 25 50 164 which uses the pressure difference encountered during compaction or clogging of bulk material between the conveyor line and the secondary line for introducing clean gas from the secondary line into the conveyor line along the area of the compaction of bulk material so as to dissolve the latter. In this manner, a high-speed conveying as well as the usually preferred slow-speed conveying even of such bulk material which is difficult to handle like e.g. fatty bulk material is possible without being deposited on the inner wall surface of the conveyor line and encountering a gradual closing of the latter, or formation of thick deposits at the wall surface which would cause clogging when flaking off.

Each conveyor line section in this known apparatus is provided with either a shut off valve or an overflow valve. The flanged connection between two conveyor line sections includes a centering ring, two tension rings and two flange rings which are bolted together. The end faces of the metallic pipes must be provided with welded-on rings about which the respective elastic inner pipe is folded. The manufacture is thus complicated especially since only the straight conveyor line sections are mass-producable as subsequent adjustments to the local conditions are not possible. Each apparatus must thus be individually planned and in particular when considering the multitude of existing arcs in the line path must be individually manufactured for the most part.

SUMMARY OF THE INVENTION

It is thus an object of the present invention to provide an improved apparatus for pneumatically conveying bulk material obviating the afore-stated drawbacks.

This object and others which will become apparent hereinafter are attained in accordance with the present invention by connecting adjacent conveyor line sections via a sectional ring which is placed over each axial end of each outer pipe of adjacent conveyor line sections and about which said elastic pipe is folded outwardly, a flange element supporting the thus shaped axial ends of adjacent conveyor line sections and external brace elements extending between successive flange elements for bracing the latter.

Suitably each flange element includes a radial bore for connecting the clean gas carrying secondary line with the interior of said conveyor line.

By providing the connection between adjoining conveyor line sections in this manner, the use of smooth outer pipes made of simple pipe sections is possible so that special lengths which are e.g. required for attachment to vessels or bow-shaped portions or for arcs designed as traverses can be cut to length at the location during mounting and need no further treatment. In addition, the connections between the secondary line and the conveyor line via the flange elements allows a simplified manufacture of the conveyor line sections and avoids any problems when the elastic pipe is lengthened during operation.

Preferably, four such brace elements are provided symmetrical about the axis as defined by the conveyor line section in order to ensure a uniform tensioning of successive flange elements. Each such brace element includes a threaded bolt with one end connected to the flange element at one side thereof, a sleeve having one end threadably engaged with the other end of the threaded bolt, and a tie rod having one end threadably engaged with the other end of the sleeve and another end connected with the facing side of the adjacent flange element.

Suitably, each flange element is provided with an annular groove at each side thereof facing the conveyor line sections so as to permit a central and sealing support of the latter.

According to another feature of the invention, the outer pipe of each conveyor line section is provided with a vent bore in the area of which the inner wall surface of the outer pipe is lined with a strip of air-permeable material such as a textile flat fabric of plastic fibers.

BRIEF DESCRIPTION OF THE DRAWING

The above and other objects, features and advantages of the present invention will now be described in more detail with reference to the accompanying drawing in which:

FIG. 2 is a longitudinal section of a conveyor line section in accordance with one embodiment of the present invention;

FIG. 3 is a top view of the conveyor line section of FIG. 2;

FIG. 6 is a cross sectional view on an enlarged scale of the conveyor line section in the area of a vent valve; and FIG. 7 is an exemplified illustration of a conveyor line composed of conveyor line sections and defining a 90° arc.

DETAILED DESCRIPTION OF A PREFERRED EMBODIMENT

Figure 1:
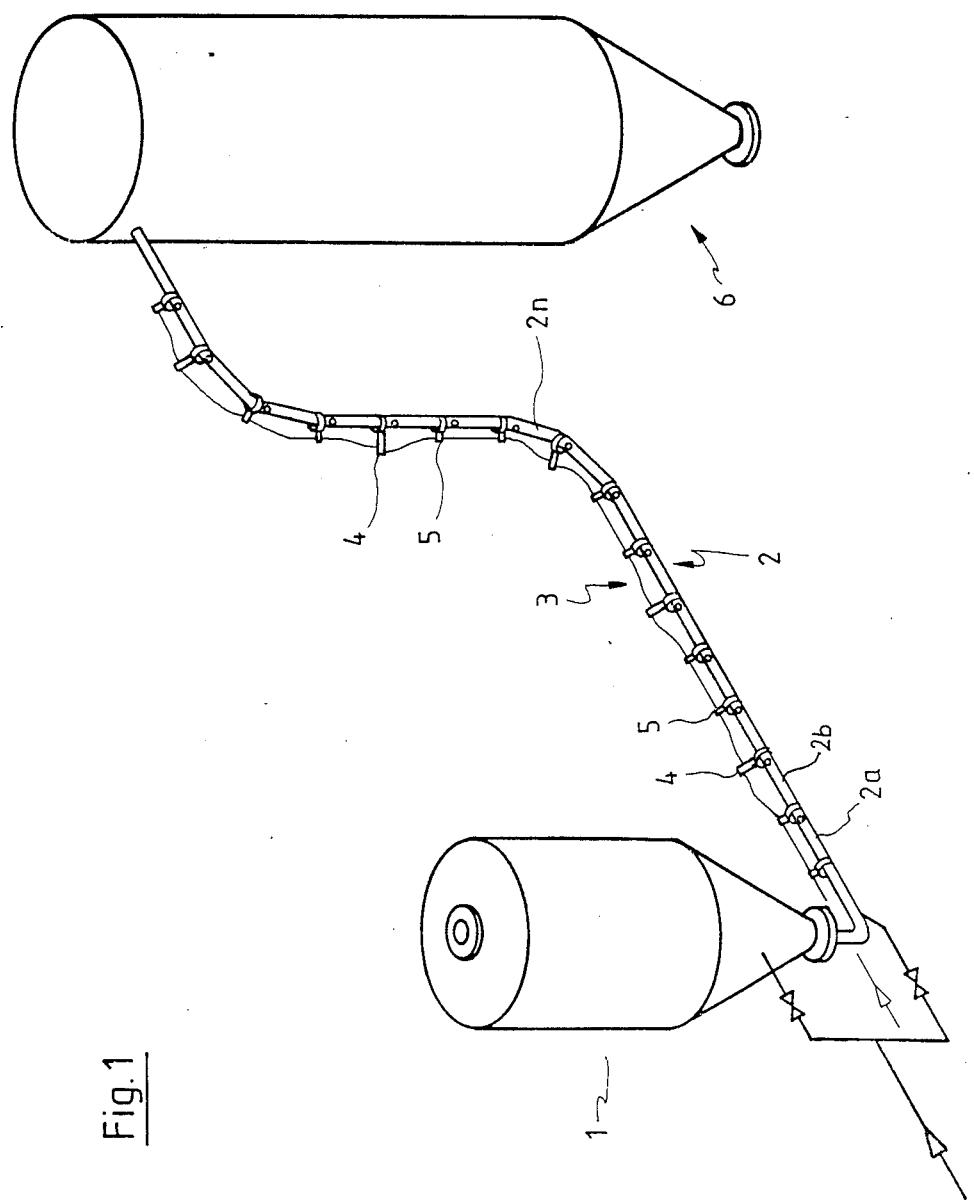
FIG. 1 is a perspective view of an overall apparatus for conveying bulk material and embodying the present invention.

Referring firstly to FIG. 1, there is shown a perspective view of an overall apparatus for conveying bulk material. The apparatus includes a charging station 1 from which bulk material is fed and transported through and into a conveyor line or conduit 2 which consists of a number of conveyor line sections 2n (2a, 2b ... 2n) and leads to a receiving receptacle 6 e.g. a separator or a silo. Charging and introduction of bulk material into the conveyor line 2 can be made by any suitable means like e.g. from a pressure vessel (as indicated schematically) or by means of a rotary feeder.

Extending parallel to the conveyor line 2 is a secondary line 3 which contains clean gas and is subdivided into various sections by spaced shut-off valves 4 responsive to a pressure difference between the secondary line 3 and the conveyor line 2. Each section of the secondary line 3 is further multiply connected to the conveyor line 2 via overflow valves 5.

Turning now to FIG. 2 which illustrates a longitudinal section of one section 2n of the conveyor line 2 in accordance with one embodiment of the present invention, there can be seen that the section 2n includes a rigid outer pipe e.g. a metallic pipe 10 and an elastic inner pipe e.g. a textile-armored rubber tube 11 which is enclosed by the metallic pipe 10 and is connected at its opposing ends with the latter in pressure-sealed manner as will be described hereinafter. In pressureless state, the rubber tube 11 has an outer diameter which is smaller than the inner diameter of the metallic pipe 10. Thus, a chamber 12 is defined between the metallic pipe 10 and the tube 11 and is connected to the atmosphere via a rain protective dust filter generally indicated by reference numeral 15.

Figure 4:
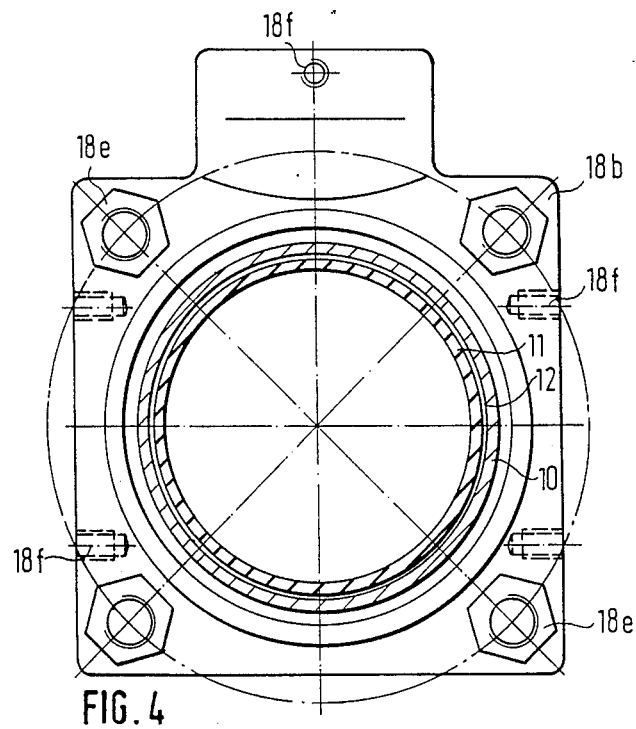
FIG. 4 is a cross sectional view of the conveyor line section taken along the line A—A in FIG. 2.
Figure 5:
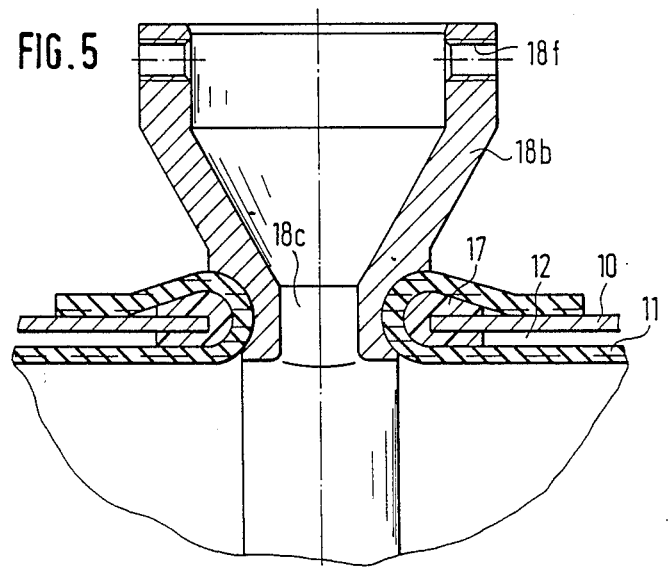
FIG. 5 is a cross sectional view on an enlarged scale of a flanged connection for joining two conveyor line sections.

Referring now to FIGS. 2 to 5, and in particular to FIG. 5, there is shown a cross sectional view on an enlarged scale of a flanged connection for the pressure-sealed connection between the rubber tube 11 and the metallic pipe 10, on the one hand, and adjacent conveyor line sections 2n, on the other hand. Arranged at the end face of the metallic pipe 10 and partly projecting into the chamber 12 is a sectional ring 17 of U-shape which is preferably made of suitable plastic material to serve as edge protection and around which the rubber tube 11 is folded outwardly. The axial end of the adjoining metallic pipe of the respective conveyor line section is provided with a same sectional ring about which the respective rubber tube is folded outwardly.

Extending between opposing sectional rings 17 of adjacent conveyor line sections 2n is a flanged element 18 which is provided with respective annular grooves 18a for supporting the facing axial ends of adjacent conveyor line sections 2n. The annular grooves 18a ensure a centering, a more uniform surface pressure and a larger sealing surface of the conveyor line section 2n to be supported.

At its upper end, the flanged element 18 is provided with a screwed flange 18b which is connected via a radial bore 18c with the interior of the flange element 18. Threadably engaged in the screwed flange 18b is either a shut off valve 4 or an overflow valve 5. Thus, the screwed flange 18b permits a communication between the interior of the rubber tube 11 and the secondary line 3.

As can be seen especially from FIG. 4, the flange element 18 is further provided at each side thereof with four tap holes 18e arranged symmetrical about the axis of the conveyor line section for supporting brace or tension elements by which adjacent flange elements 18 between which a conveyor line section 2n extends can be tightened. As shown in particular in FIG. 3, each brace element includes a threaded bolt 19 which is engaged in a tap hole 18e at one side of the respective flange element 18 and a tie rod 20 e.g. threaded rod which extends over a major part of the conveyor line section 2n and is supported in the respective tap hole 18e of the facing side of the adjacent flange element 18. FIGS. 2 and 3 show that the threaded bolts 19 and the associated tie rods 20 between successive flange elements 18 are connected to each other by threaded sleeves 21 which have the usual combination of right-handed threads and left-handed threads so that the brace elements can be tightened by suitably turning the sleeves 21 to ensure a pressure-sealed connection of the conveyor line sections 2n.

In order to permit the line path to be mounted in any desired manner e.g. suspending, standing or lateral attachment and thus being adaptable to local conditions, the flange element 18 is provided with suitable tap holes 18f.

FIG. 6 illustrates a cross sectional view on an enlarged scale of an conveyor line section in the area of the dust filter 15 which is indicated only by way of dash-dot lines. The filter 15 is suitably accommodated in a housing 15b which is topped by a rain protecting cover 15c and inserted in a connecting piece 16 suitably attached to the metallic pipe 10 e.g. through welding. A vent bore 15a in the metallic pipe 10 allows a communication between the interior of the rubber tube 11 and the dust filter 15.

Interposed between the metallic pipe 10 and the rubber tube 11 at least in the area of the vent bore 15a is a strip 25 which is made of air permeable material such as a plastic fabric (strip-shaped textile flat fabric of plastic fibers) and is glued to the inner wall surface of the metallic pipe 10. The strip 25 prevents the rubber tube 11 from sealingly bearing against the vent bore 15a by means of the conveying pressure prevailing in its interior, and thus prevents the vent bore 15a from becoming ineffective.

Although, FIGS. 2 and 3 show examples of straight conveyor line sections 2n, it is certainly feasible to provide line paths including arcuated line sections without departing from the spirit of the invention. As shown in the nonlimiting example of FIG. 7, the conveyor line extends along a 90° arc. In this embodiment, the end faces of the flange elements 18 of adjoining conveyor line sections 2n do not extend parallel to each other; Rather, these end faces are inclined or oblique about a defined angle relative to the respective radial plane. In the nonlimiting example of FIG. 7, this angle is 15° so that five such conveyor line sections with bilaterally angled end faces are used to attain the 90° arc with a radius of curvature defined by the length of the respective outer pipes.

Instead of providing the flange elements with inclined end faces, the arc of 90° may certainly be obtained by providing the end faces of the flange elements parallel to each other and by cutting the respective metallic pipes slantingly to their axis instead of perpendicularly.

While the invention has been illustrated and described as embodied in an Apparatus for Pneumatically Conveying Bulk Material, it is not intended to be limited to the details shown since various modifications and structural changes may be made without departing in any way from the spirit of the present invention.

What is claimed as new and desired to be protected by Letters Patent is set forth in the appended claims:
We claim:

1. Apparatus for pneumatically conveying bulk material, comprising:
   a conveyor line for transporting the bulk material, said conveyor line including a plurality of conveyor line sections, each of which having a rigid outer pipe and an elastic inner pipe of an outer diameter smaller than the inner diameter of said outer pipe in the pressureless state;
   connecting means for joining adjacent conveyor line sections, said connecting means including a sectional ring which is placed over the axial end of each outer pipe of adjacent conveyor line sections and acts as rounded edge protection and about which said elastic pipe is folded outwardly, a flange element arranged between the thus shaped axial ends of adjacent conveyor line sections for supporting the latter, and tension means extending between successive flange elements for bracing the latter; and
   a secondary line carrying clean gas, each of said flange elements including a radial bore for connecting said secondary line with the interior of said conveyor line.

2. Apparatus as defined in claim 1 wherein said outer pipe is made of pipe sections which are cut to length.

3. Apparatus as defined in claim 1 wherein said outer pipe defines an axis, said tension means including four external brace elements extending symmetrical about said axis.

4. Apparatus as defined in claim 1, and further comprising valve means for regulating communication between said conveyor line and said secondary line, said valve means including shut-off valves subdividing said secondary line in sections and being responsive to the pressure difference between said secondary line and said conveyor line, and overflow valves via which each of said sections of said secondary line is multiply connected to the interior of said conveyor line.

5. Apparatus as defined in claim 4 wherein said radial bores of said flange elements are connected with said valve means.

6. Apparatus as defined in claim 4 wherein said shut-off valves and said overflow valves are selectively mounted on said flange elements.

7. Apparatus as defined in claim 3 wherein each brace element includes a threaded bolt with one end connected to said flange element at one side thereof, a sleeve having one end threadably engagable with the other end of said threaded bolt, and a tie rod having one end threadably engagable with the other end of said sleeve and another end connected to the facing side of the adjacent flange element.

8. Apparatus as defined in claim 1 wherein said sectional ring is made of plastic material.

9. Apparatus for pneumatically conveying bulk material, comprising:
   a conveyor line for transporting the bulk material, said conveyor line including a plurality of conveyor line sections, each of which having a rigid outer pipe and an elastic inner pipe of an outer diameter smaller than the inner diameter of said outer pipe in the pressureless state;
   connecting means for joining adjacent conveyor line sections, said connecting means including a sectional ring which is placed over the axial end of each outer pipe of adjacent conveyor line sections and about which said elastic pipe is folded outwardly, a flange element arranged between the thus shaped axial ends of adjacent conveyor line sections for supporting the latter, and tension means extending between successive flange elements for bracing the latter; and
   a secondary line carrying clean gas, each of said flange elements including a radial bore for connecting said secondary line with the interior of said conveyor line and being provided with an annular groove at each side thereof for centrally and sealingly supporting adjoining conveyor line sections.

10. Apparatus as defined in claim 9 wherein said outer pipe is made of pipe sections which are cut to length.

11. Apparatus as defined in claim 9 wherein said outer pipe defines an axis, said tension means including four external brace elements extending symmetrical about said axis.

12. Apparatus as defined in claim 9, and further comprising valve means for regulating communication between said conveyor line and said secondary line, said valve means including shut-off valves subdividing said secondary line in sections and being responsive to the pressure difference between said secondary line and said conveyor line, and overflow valves via which each of said sections of said secondary line is multiply connected to the interior of said conveyor line.

13. Apparatus as defined in claim 12 wherein said radial bores of said flange elements are connected with said valve means.

14. Apparatus as defined in claim 12 wherein said shut-off valves and said overflow valves are selectively mounted on said flange elements.

15. Apparatus as defined in claim 11 wherein each brace element includes a threaded bolt with one end connected to said flange element at one side thereof, a sleeve having one end threadably engagable with the other end of said threaded bolt, and a tie rod having one end threadably engagable with the other end of said sleeve and another end connected to the facing side of the adjacent flange element.

16. Apparatus for pneumatically conveying bulk material, comprising:
   a conveyor line for transporting the bulk material, said conveyor line including a plurality of conveyor line sections, each of which having a rigid outer pipe and an elastic inner pipe of an outer diameter smaller than the inner diameter of said outer pipe in the pressureless state, said outer pipe of each conveyor line section being provided with a vent bore and having an inner wall surface which is lined with a member made of air-permeable material in the area of said vent bore;
   connecting means for joining adjacent conveyor line sections, said connecting means including a sectional ring which is placed over the axial end of each outer pipe of adjacent conveyor line sections and about which said elastic pipe is folded outwardly, a flange element arranged between the thus shaped axial ends of adjacent conveyor line sections for supporting the latter, and tension means extending between successive flange elements for bracing the latter; and
   a secondary line carrying clean gas, each of said flange elements including a radial bore for connecting said secondary line with the interior of said conveyor line.

17. Apparatus as defined in claim 16 wherein said member is a strip-shaped textile flat fabric of plastic fibers.

18. Apparatus as defined in claim 16 wherein said outer pipe is made of pipe sections which are cut to length.

19. Apparatus as defined in claim 16 wherein said outer pipe defines an axis, said tension means including four external brace elements extending symmetrical about said axis.

20. Apparatus as defined in claim 16, and further comprising valve means for regulating communication between said conveyor line and said secondary line, said valve means including shut-off valves subdividing said secondary line in sections and being responsive to the pressure difference between said secondary line and said conveyor line, and overflow valves via which each of said sections of said secondary line is multiply connected to the interior of said conveyor line.

21. Apparatus as defined in claim 20 wherein said radial bores of said flange elements are connected with said valve means.

22. Apparatus as defined in claim 20 wherein said shut-off valves and said overflow valves are selectively mounted on said flange elements.

23. Apparatus as defined in claim 19 wherein each brace element includes a threaded bolt with one end connected to said flange element at one side thereof, a sleeve having one end threadably engagable with the other end of said threaded bolt, and a tie rod having one end threadably engagable with the other end of said sleeve and another end connected to the facing side of the adjacent flange element.

* * * * *